(12) United States Patent
Yap et al.

(10) Patent No.: US 10,198,601 B2
(45) Date of Patent: Feb. 5, 2019

(54) CARD READER WITH ADAPTIVE MAGNETIC HEAD ASSEMBLY

(71) Applicant: VeriFone, Inc., San Jose, CA (US)

(72) Inventors: Eng Joo Yap, Singapore (SG); Yang Hock Jeffrey Loh, Singapore (SG)

(73) Assignee: VeriFone, Inc., San Jose, CA (US)

( * ) Notice: Subject to any disclaimer, the term of this patent is extended or adjusted under 35 U.S.C. 154(b) by 53 days.

(21) Appl. No.: 15/608,148

(22) Filed: May 30, 2017

(65) Prior Publication Data

US 2018/0349652 A1 Dec. 6, 2018

(51) Int. Cl.
*G06K 7/08* (2006.01)
*G06K 7/015* (2006.01)

(52) U.S. Cl.
CPC .............. *G06K 7/015* (2013.01); *G06K 7/087* (2013.01)

(58) Field of Classification Search
CPC ............ G06K 7/00; G06K 7/04; G06K 1/186; G06K 19/06187; G06K 13/103
USPC ........................................ 235/449, 493, 453
See application file for complete search history.

(56) References Cited

U.S. PATENT DOCUMENTS

| | | |
|---|---|---|
| 3,831,119 A | 8/1974 | Ambrosio |
| 3,917,925 A | 11/1975 | Del |
| 4,788,420 A | 11/1988 | Chang |
| 5,164,576 A | 11/1992 | Anglin |
| 5,180,905 A | 1/1993 | Chen |
| 5,321,243 A | 6/1994 | Groves |
| 5,357,402 A | 10/1994 | Anhalt |
| 5,380,997 A | 1/1995 | Hania |
| 5,426,286 A | 6/1995 | Nair et al. |
| 5,892,216 A | 4/1999 | Grant |
| 5,929,414 A | 7/1999 | Saitoh |
| 5,933,812 A | 8/1999 | Meyer |
| 6,015,311 A | 1/2000 | Benjamin et al. |
| 6,179,638 B1 | 1/2001 | Lim |
| 6,235,553 B1 | 5/2001 | Kawan |

(Continued)

FOREIGN PATENT DOCUMENTS

JP 2308473 A 12/1990

OTHER PUBLICATIONS

An Office Action dated Jul. 14, 2016, which issued during the prosecution of U.S. Appl. No. 15/014,403.

(Continued)

*Primary Examiner* — Daniel St Cyr
(74) *Attorney, Agent, or Firm* — Hunton Andrews Kurth LLP

(57) ABSTRACT

Card readers with adaptive magnetic head assemblies are disclosed. According to one embodiment, a card reader may include chassis comprising a card slot that receives a portion of a magnetic stripe card; a card guiding element positioned in a card path defined by the card slot and that interacts with a datum edge of the magnetic stripe card, at least a portion of the card guiding element being rotatable relative to the card path; and a magnetic reading head provided on the card guiding element that reads a magnetic stripe on the magnetic stripe card. The card guiding element and the magnetic reading head rotate relative to the card path in response to the datum edge of the magnetic stripe card applying a force to the card guiding element, thereby substantially maintaining an alignment between the magnetic stripe and the magnetic reading head.

20 Claims, 4 Drawing Sheets

(56) References Cited

U.S. PATENT DOCUMENTS

| | | |
|---|---|---|
| 6,308,889 B1 | 10/2001 | Grant et al. |
| 6,318,632 B1 | 11/2001 | Grant |
| 6,325,653 B1 | 12/2001 | Takahashi |
| 6,341,727 B1 | 1/2002 | Canard et al. |
| 6,370,028 B1 | 4/2002 | Seeley et al. |
| 6,370,029 B1 | 4/2002 | Kawan |
| 6,431,898 B1 | 8/2002 | Asakawa |
| 6,435,887 B2 | 8/2002 | Koitsalu |
| 6,579,126 B2 | 6/2003 | Narumo et al. |
| 6,616,050 B1 * | 9/2003 | Oki .................. G06K 7/0021 235/441 |
| 6,641,034 B1 | 11/2003 | Oki |
| 6,796,842 B1 | 9/2004 | Wang |
| 6,821,137 B2 | 11/2004 | Koser |
| 6,951,473 B2 | 10/2005 | Takahashi et al. |
| 7,009,846 B1 | 3/2006 | Wang et al. |
| 7,052,325 B2 | 5/2006 | Lin et al. |
| 7,677,462 B2 | 3/2010 | Hynes et al. |
| 8,544,743 B2 | 10/2013 | Hong et al. |
| 9,033,235 B1 * | 5/2015 | Templeton ............. G06K 7/084 235/435 |
| 2004/0174662 A1 | 9/2004 | Oh |
| 2005/0002146 A1 | 1/2005 | Albano |
| 2005/0268548 A1 | 12/2005 | Lovette |
| 2007/0170254 A1 | 7/2007 | Ishihara et al. |
| 2011/0278359 A1 | 11/2011 | Kasai et al. |
| 2012/0043382 A1 | 2/2012 | Hong et al. |
| 2014/0117091 A1 | 5/2014 | Whytock |
| 2014/0327998 A1 | 11/2014 | Barneron |
| 2015/0097033 A1 | 4/2015 | Yanko |
| 2016/0275316 A1 * | 9/2016 | Yoon .................... G06K 7/0004 |

OTHER PUBLICATIONS

An Office Action dated Aug. 7, 2012, which issued during the prosecution of U.S. Appl. No. 12/857,991.

An Office Action dated Dec. 4, 2012, which issued during the prosecution of U.S. Appl. No. 12/857,991.

Notice of Allowance dated Aug. 8, 2013, which issued during the prosecution of U.S. Appl. No. 12/857,991.

\* cited by examiner

CARD READER WITH ADAPTIVE MAGNETIC HEAD ASSEMBLY

BACKGROUND OF THE INVENTION

1. Field of the Invention

The present disclosure relates generally to transaction card reading devices, and, more particularly, to a card reader with adaptive magnetic head assembly.

2. Description of the Related Art

Magnetic card readers are employed widely in various applications, including point of sale devices, including, for example, point of sale (POS) terminals, cash registers, ATMs, security systems (e.g., locks), etc. Often, a card having a magnetic stripe is inserted into the card reader, and then withdrawn from the card reader. As the card is withdrawn, a magnetic reading head in the magnetic card reader reads data from the magnetic stripe. If the card is not withdrawn in a manner than maintains alignment between the magnetic stripe and the magnetic reading head—in other words, there is angular rotation of the card during withdrawal—a card read error may result.

A fixed card slot width for a card reader is typically designed to accommodate the largest card width of a magnetic stripe card to be inserted in the card slot width. As such, the card width may be narrower than the card slot. The card width may also become narrower from being worn out over repeated use. As the difference between the card width and the slot width increases, the potential for angular rotation also increases.

To achieve a desired more compact design of a card reader, a short mount piece is often utilized, which increases the potential for card read error caused by angular rotation of the card during withdrawal. When a shorter mount piece is used, it becomes difficult to constrain the angular rotation of the card to ensure that the card remains parallel to the magnetic head, which may cause the encoded tracks on the card to become misaligned with the magnetic head, which may cause read error of the card. This may cause a user to have to reinsert the card to be read again.

These and other deficiencies exist.

SUMMARY OF THE INVENTION

Cards readers with adaptive magnetic head assemblies are disclosed. According to one embodiment, a card reader may include chassis comprising a card slot that receives at least a portion of a magnetic stripe card; a card guiding element positioned in a card path defined by the card slot and that interacts with a datum edge of the magnetic stripe card, at least a portion of the card guiding element being rotatable relative to the card path; and a magnetic reading head provided on the card guiding element that reads a magnetic stripe on the magnetic stripe card. The card guiding element and the magnetic reading head rotate relative to the card path in response to the datum edge of the magnetic stripe card applying a force to the card guiding element, thereby substantially maintaining an alignment between the magnetic stripe on the magnetic stripe card and the magnetic reading head.

In one embodiment, the card guiding element comprises a plurality of portions.

In one embodiment, the card reader may further include at least one biasing element that biases the datum edge of the magnetic stripe card against the card guiding element. The biasing element may include at least one spring.

In one embodiment, the card reader may further include a second card guiding element that is fixed relative to the card path.

In one embodiment, the card reader may further include at least one rotation biasing element that biases a rotation of the card guiding element. The biasing element may include at least one spring, at least one stopper, etc.

In one embodiment, the card reader may be part of a point of sale device, an automated teller machine, a security system, etc.

According to another embodiment, a card reader may include a chassis comprising a card slot that receives at least a portion of a magnetic stripe card; a card guiding element positioned in a card path defined by the card slot and that interacts with a datum edge of the magnetic stripe card, at least a portion of the card guiding element being rotatable relative to the card path; and a magnetic reading head provided on the card guiding element that reads a magnetic stripe on the magnetic stripe card. The card guiding element and the magnetic reading head rotate relative to the card path in response to the datum edge of the magnetic stripe card applying a force to the card guiding element, thereby reducing an angular difference between the magnetic stripe on the magnetic stripe card and the magnetic reading head.

In one embodiment, the card guiding element comprises a plurality of portions.

In one embodiment, the card reader may further include at least one biasing element that biases the datum edge of the magnetic stripe card against the card guiding element. The biasing element may include at least one spring.

In one embodiment, the card reader may further include a second card guiding element that is fixed relative to the card path.

In one embodiment, the card reader may further include at least one rotation biasing element that biases a rotation of the card guiding element. The biasing element may include at least one spring, at least one stopper, etc.

In one embodiment, the card reader may be part of a point of sale device, an automated teller machine, a security system, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any manner within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Several embodiments of the present invention and their advantages may be understood by referring to FIGS. 1-4.

Figure 1:
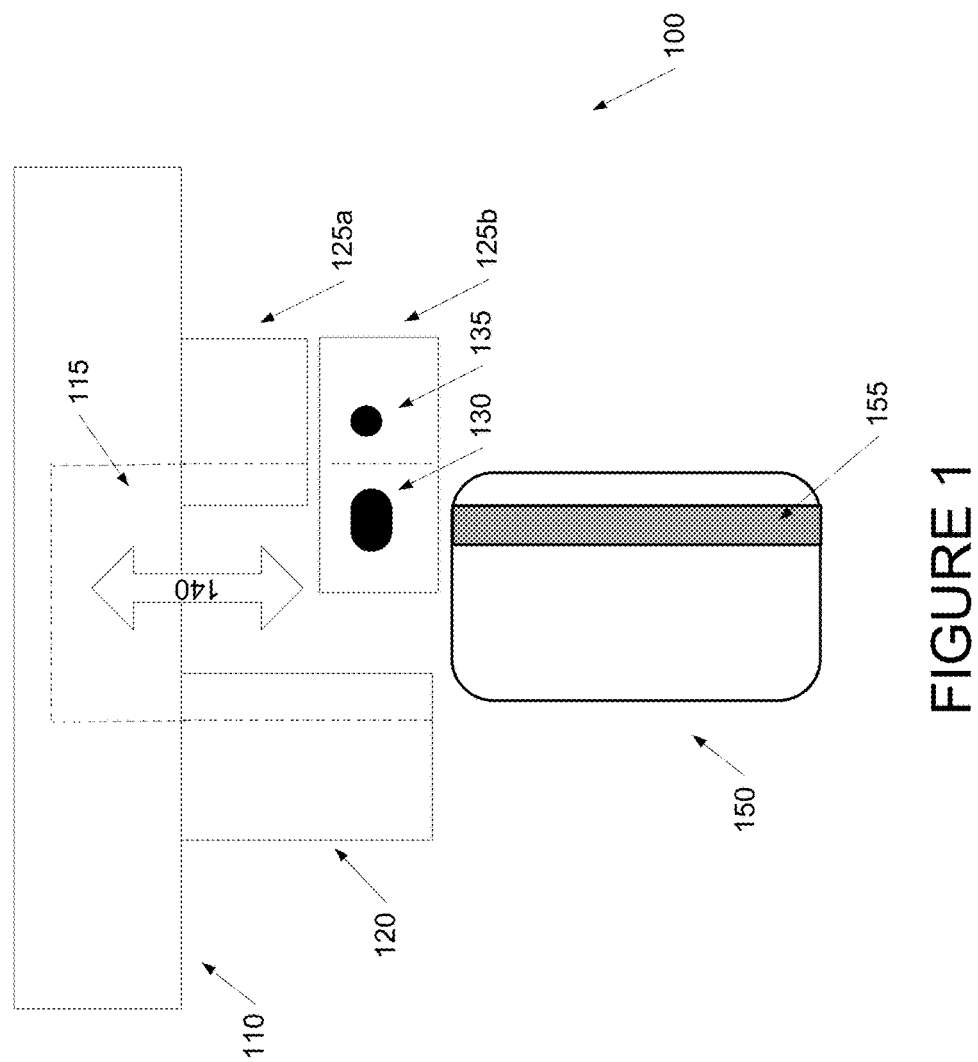
FIG. 1 depicts a top view of a card reader according to one embodiment.

Referring to FIG. 1, a block diagram of card reader 100 is provided according to one embodiment. In one embodiment, card reader 100 may include a chassis having mount piece 110, card slot 115, first card guiding element 120, second card guiding element 125 (comprising second card guiding portions 125a and 125b), magnetic reading head 130, and pivot 135.

Although second card guiding element 125 is illustrated has having portions 125a and 125b, it should be recognized that second card guiding element may be implemented as a single element, or as any other number of portions as is necessary and/or desired.

In one embodiment, card reader 100 may be part of a point of sale device, an automated teller machine, a kiosk, a gas pump, a security system, an access control system, or any other suitable device that may receive card 150, such as a magnetic stripe card. The chassis may provide a housing for some or all of the above-mentioned elements.

In one embodiment, first card guiding element 120, second card guiding element 125, and card slot 115 may define card path 140 to receive card 150 and may guide card 150 during insertion and retraction from card slot 115 and align magnetic stripe 155 of card 150 with magnetic reading head 130. The width of card path 140 may be designed to receive the largest expected card width. Thus, the difference between the width of card 150 and card path 140 permits some degree of angular rotation of card 150 as moves along card path 140.

In one embodiment, a length of first card guiding element 120 and a length of second card guiding element 125 may be shorter than a length of card 150 in order to achieve a more compact design for the card reader. The length of one or both of first card guiding element 120 and second card guiding element 125 may depend, in part, on the depth of card slot 115, the position of magnetic reading head 130 along card path 140, etc. In one embodiment, the length of first card guiding element 120 and second card guiding element 125 may be different.

In one embodiment, second card guiding element 125 may interact with an edge of the card 150 that is closest to magnetic stripe 155. This may be referred to as a "datum edge" of card 150. First card guiding element 120 may interact with an edge of card 150 that is furthest from the magnetic stripe 155.

In one embodiment, first card guiding element 120 may further include a biasing element (not shown), such as a leaf spring or similar element, to bias the datum edge of card 150 toward second card guiding element 125 as card 150 moves along card path 140. Alternatively, the biasing element may be used to bias first card guiding element 120 so that it adjusts to the width of the card 150 by minimizing or reducing the difference between card 150 width and the width of the card path 140.

In one embodiment, first card guiding element 120 may be fixed relative to mount piece 110 and card slot 115, and at least a portion of second card guiding element 125 may rotate in response to a clockwise or counterclockwise force applied to second card guiding element 125 by the datum edge of card 150 as card 150 is moved along card path 140 during insertion or removal. In one embodiment, pivot 135 may be provided to facilitate the rotation of at least a portion of second card guiding element 125.

In one embodiment, the amount of rotation for at least a portion of second card guiding element 125 may be based on an expected angular rotation as a card 150 is inserted and/or withdrawn from card slot 115. This may be based on, for example, the largest expected width difference between card 150 and card path 140. For example, the card 150 may rotate by up to about 10 degrees relative to card path 140. In another embodiment, the card 150 may rotate by up to about 5 degrees relative to card path 140. Other amounts of rotation may be used as is necessary and/or desired.

In one embodiment, the direction of rotation (e.g., clockwise or counterclockwise) may depend on the position of the person swiping the card relative to card reader 100, whether the person is swiping the card with the person's left of right hand, etc. For example, a person located on the right of card reader 100 and using his or her right hand to swipe may tend to bias the card in a clockwise direction.

Magnetic reading head 130, which may be provided on a rotating portion of second card guiding element 125 will also rotate with the rotating portion of second card guiding element 125 to maintain substantial alignment with magnetic stripe 155 to facilitate the reading of data on the data tracks of magnetic stripe 155.

As card 150 is removed from card slot 115, magnetic reading head 130 may read data from one or more tracks on magnetic stripe 155 of card 150.

In one embodiment, a stopper (not shown) may restrict the amount of angular rotation of a portion of second card guiding element 125 as is necessary and/or desired. In one embodiment, a rotation biasing element (not shown) may bias second card guiding element 125 to return to a position, such as a neutral position, when no force is being applied. In one embodiment, the rotation biasing element may comprise a spring (not shown).

Figure 2:
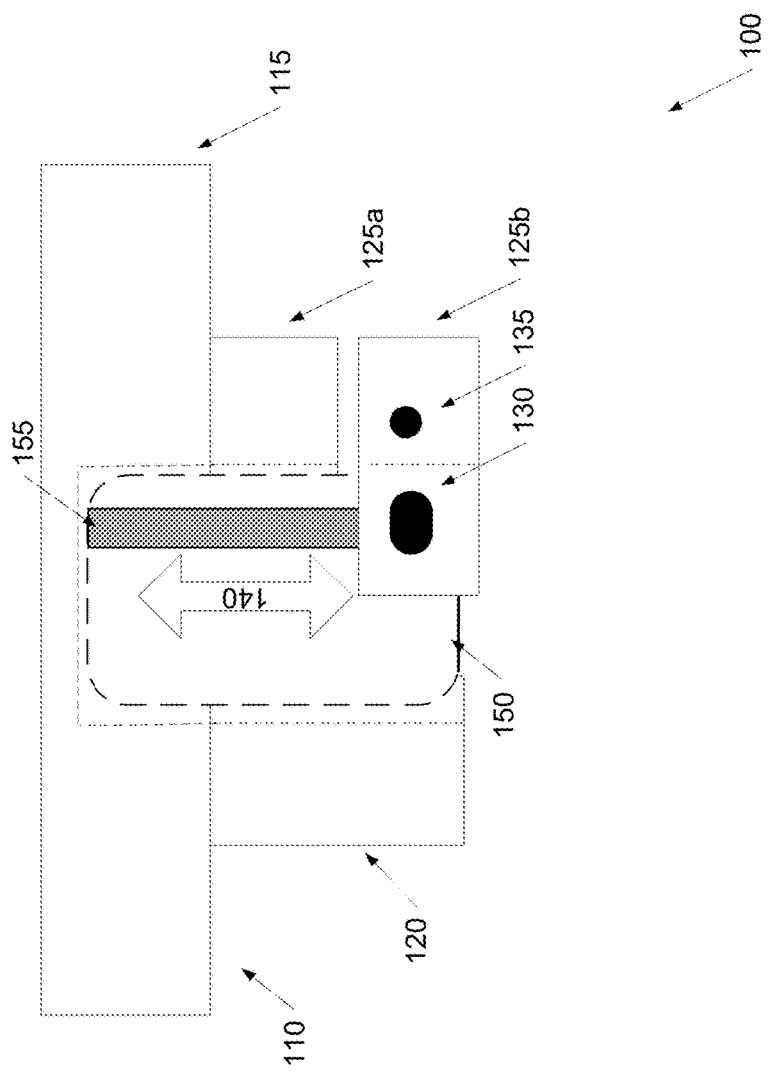
FIG. 2 depicts a top view of a card reader having a card inserted therein according to one embodiment.

Referring to FIG. 2, a top view of the card reader of FIG. 1 having card 150 fully inserted into card slot 115 along card path 140 is provided according to one embodiment. In FIG. 2, card 150 is substantially aligned with card path 140; thus, the datum edge of card 150 is not applying force that causes at least a portion of second card guiding element 125 (e.g., portion 125b) to have an angular rotation relative to card path 140, and magnetic reading head 130 is substantially aligned with magnetic stripe 155.

In one embodiment, a biasing element (not shown) may bias card 150 toward second card guiding element 125.

Figure 3:
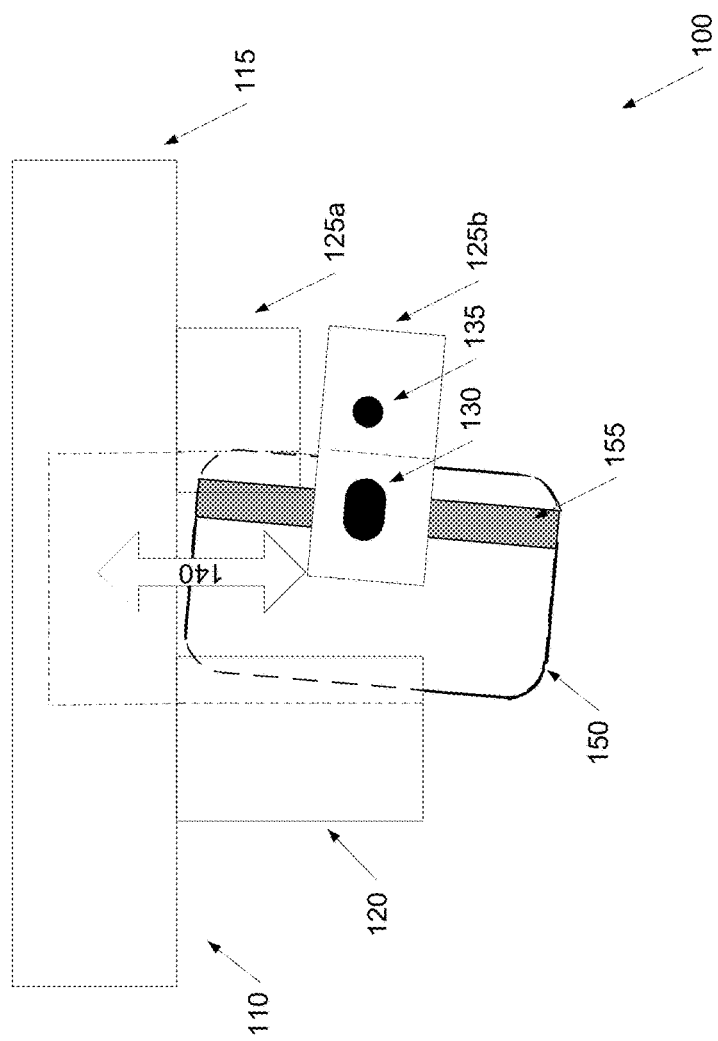
FIG. 3 depicts a top view of a card reader having a card partially removed according to one embodiment.

Referring to FIG. 3, a top view of the card reader of FIG. 1 having card 150 partially inserted or retracted along card path 140 according to one embodiment. In FIG. 3, card 150 is illustrated as having a clockwise angular rotation relative to card path 140. Thus, the datum edge of card 150 applies a force to at least a portion of second card guiding element 125 (e.g., portion 125b). In response to this angular rotation, at least a portion of second card guiding element 125 (e.g., portion 125b) rotates in the direction of the angular rotation to maintain contact (e.g., parallel contact) with the datum edge of magnetic strip card 150. Thus, magnetic reading head 130 maintains substantial alignment with magnetic stripe 155.

In one embodiment, a biasing element (not shown) may bias card 150 toward second card guiding element 125 as card 150 is withdrawn.

Figure 4:
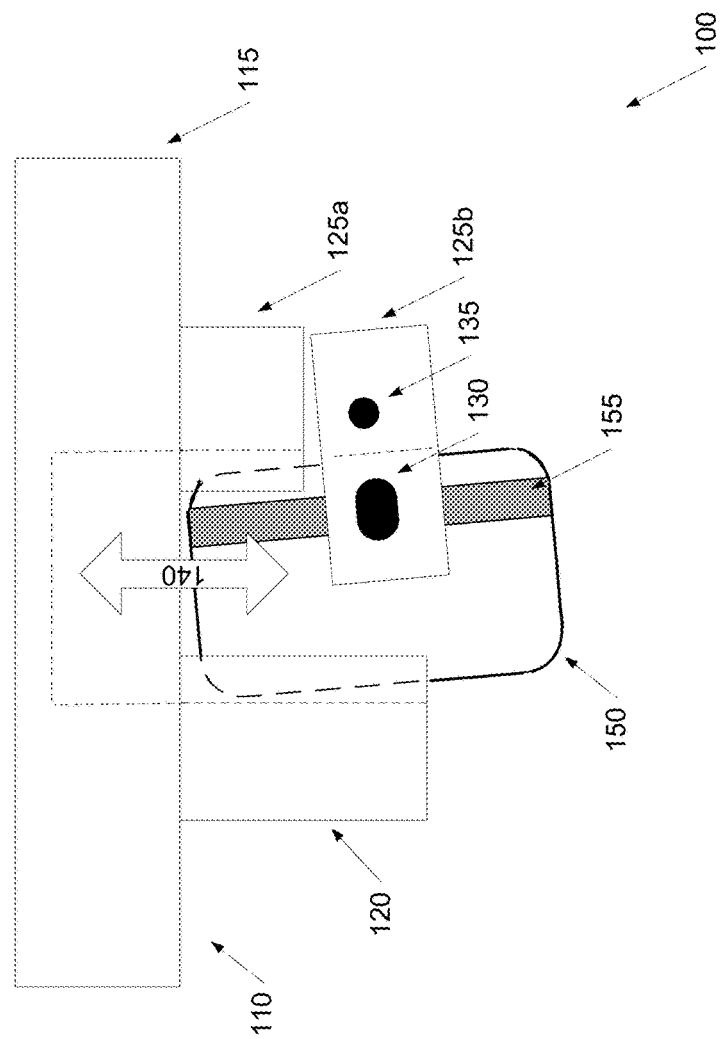
FIG. 4 depicts a top view of a card reader having a card partially removed according to another embodiment.

Referring to FIG. 4, a top view of the card reader of FIG. 1 having card 150 partially inserted or retracted along card path 140 according to another embodiment. In FIG. 3, card 150 is illustrated as having a counterclockwise angular rotation relative to card path 140. Thus, the datum edge of card 150 applies a force to at least a portion of second card guiding element 125 (e.g., portion 125b). Thus, the datum edge of card 150 applies a force to at least a portion of second card guiding element 125 (e.g., portion 125b). In response to this angular rotation, at least a portion of second card guiding element 125 (e.g., portion 125b) rotates in the direction of the angular rotation to maintain contact with the datum edge of magnetic strip card 150. Thus, magnetic reading head 130 maintains substantial alignment with magnetic stripe 155.

It will be appreciated by those skilled in the art that the various embodiments are not limited by what has been particularly shown and described hereinabove. Rather the scope of the various embodiments includes both combinations and sub-combinations of features described hereinabove and variations and modifications thereof which are not in the prior art. It should further be recognized that these various embodiments are not exclusive to each other.

It will be readily understood by those persons skilled in the art that the embodiments disclosed here are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the above description.

Accordingly, while the various embodiments have been described in detail in relation to exemplary embodiments, it is to be understood that this disclosure is only illustrative and exemplary and is made to provide an enabling disclosure. Accordingly, the foregoing disclosure is not intended to be construed or to limit the various embodiments or otherwise to exclude any other such embodiments, adaptations, variations, modifications or equivalent arrangements.

What is claimed is:

1. A card reader, comprising:
   a chassis comprising a card slot that receives at least a portion of a magnetic stripe card;
   a card guiding element positioned in a card path defined by the card slot and that interacts with a datum edge of the magnetic stripe card, at least a portion of the card guiding element being rotatable relative to the card path; and
   a magnetic reading head provided on the card guiding element that reads a magnetic stripe on the magnetic stripe card;
   wherein the card guiding element and the magnetic reading head rotate relative to the card path in response to the datum edge of the magnetic stripe card applying a force to the card guiding element, thereby substantially maintaining an alignment between the magnetic stripe on the magnetic stripe card and the magnetic reading head.

2. The card reader of claim 1, wherein the card guiding element comprises a plurality of portions.

3. The card reader of claim 1, further comprising at least one biasing element that biases the datum edge of the magnetic stripe card against the card guiding element.

4. The card reader of claim 3, wherein the biasing element comprises at least one spring.

5. The card reader of claim 1, further comprising a second card guiding element that is fixed relative to the card path.

6. The card reader of claim 1, further comprising at least one rotation biasing element that biases a rotation of the card guiding element.

7. The card reader of claim 6, wherein the rotation biasing element comprises at least one spring.

8. The card reader of claim 6, wherein the rotation biasing element comprises at least one stopper.

9. The card reader of claim 1, wherein the card reader is part of a point of sale device.

10. The card reader of claim 1, wherein the card reader is part of an automated teller machine.

11. The card reader of claim 1, wherein the card reader is part of a security system.

12. A card reader, comprising:
    a chassis comprising a card slot that receives at least a portion of a magnetic stripe card;
    a card guiding element positioned in a card path defined by the card slot and that interacts with a datum edge of the magnetic stripe card, at least a portion of the card guiding element being rotatable relative to the card path; and
    a magnetic reading head provided on the card guiding element that reads a magnetic stripe on the magnetic stripe card;
    wherein the card guiding element and the magnetic reading head rotate relative to the card path in response to the datum edge of the magnetic stripe card applying a force to the card guiding element, thereby reducing an angular difference between the magnetic stripe on the magnetic stripe card and the magnetic reading head.

13. The card reader of claim 12, wherein the card guiding element comprises a plurality of portions.

14. The card reader of claim 12, further comprising at least one biasing element that biases the datum edge of the magnetic stripe card against the card guiding element.

15. The card reader of claim 14, wherein the biasing element comprises at least one spring.

16. The card reader of claim 12, further comprising a second card guiding element that is fixed relative to the card path.

17. The card reader of claim 12, further comprising at least one rotation biasing element that biases a rotation of the card guiding element.

18. The card reader of claim 17, wherein the rotation biasing element comprises at least one spring.

19. The card reader of claim 12, wherein the card reader is part of a point of sale device.

20. The card reader of claim 12, wherein the card reader is part of an automated teller machine.

* * * * *